United States Patent [19]

Sperry, III et al.

[11] Patent Number: 4,602,162
[45] Date of Patent: Jul. 22, 1986

[54] MONITORING PORT FOR ULTRAVIOLET WATER PURIFICATION SYSTEMS

[75] Inventors: Elmer A. Sperry, III, Pompton Plains; John M. Cluzel, Wyckoff, both of N.J.

[73] Assignee: Beckman Industrial Corporation, Cedar Grove, N.J.

[21] Appl. No.: 814,290

[22] Filed: Dec. 26, 1985

Related U.S. Application Data

[63] Continuation of Ser. No. 565,808, Dec. 27, 1983, abandoned.

[51] Int. Cl.⁴ ............................................. C02B 1/32
[52] U.S. Cl. .................................... 250/436; 250/435
[58] Field of Search .................. 250/436, 435, 432 R

[56] References Cited

U.S. PATENT DOCUMENTS

| | | | |
|---|---|---|---|
| 1,790,086 | 1/1931 | Boerstler | 250/432 |
| 3,471,693 | 10/1969 | Veloz | 250/432 R |
| 4,103,167 | 7/1978 | Ellner | 250/432 R |
| 4,201,916 | 5/1980 | Ellner | 250/372 |
| 4,336,223 | 6/1982 | Hillman | 422/24 |

Primary Examiner—Bruce C. Anderson
Assistant Examiner—Jack I. Berman
Attorney, Agent, or Firm—Daniel H. Bobis

[57] ABSTRACT

A monitoring port for use in measuring the intensity of the ultraviolet radiation within an ultraviolet water purification system. A UV transparent transmitting member is sealably mounted for inward, outward, and rotational movement movement with respect to a UV lamp. A locking arrangement including a tapered elastomeric gripping member and a tapered metal tightening member assures that the transmitting member may be locked in place at any desired distance from the surface of the UV lamp. A positioning arrangement such as distance indicator or a series of positions stops, may be employed to facilitate the positioning of the transmitting member at any of the selected distances.

21 Claims, 2 Drawing Figures

MONITORING PORT FOR ULTRAVIOLET WATER PURIFICATION SYSTEMS

This application is a continuation, of application Ser. No. 565,808, filed 12/27/83, now abandoned.

BACKGROUND OF THE INVENTION

The present invention relates to ultraviolet water purification systems and is directed more particularly to an improved monitoring port for facilitating measurements of the intensity of ultraviolet radiation at selectable positions within the purification system.

In order to purify water which is contaminated by bacteria, it is a common practice to direct the water through a purification system which exposes the water to ultraviolet (UV) radiation. Because UV radiation is able to kill bacteria, the water emerging from such a purification system has a greatly reduced live bacteria content and can often be safely used without further treatment.

Because the effectiveness of UV purification systems is dependent upon the ability of a UV lamp or lamps to apply more than a predetermined intensity of UV radiation to the water for more than a predetermined time, such systems are usually provided with UV monitoring arrangements for measuring the UV output of the lamps. Such monitoring arrangements include UV sensitive electronic devices which are coupled to respective UV lamps through respective UV transparent monitoring ports or windows that penetrate the external walls of the purification system. One such monitoring arrangement is described in U.S. Pat. No. 3,471,693, which issued in the name of L. P. Veloz on Oct. 7, 1969.

In some UV purification systems, the UV monitoring arrangement is arranged to measure the level of UV radiation which exists near the surface of a UV lamp. Monitoring arrangements of this type have monitoring ports with inlets that are located at or near the outer surface of the lamp itself, or near the outer surface of a quartz tube or envelope that surrounds the lamp and protects the same from exposure to the water to be purified. In other UV purification systems, the monitoring arrangement has a monitoring port with an inlet that is located in the fluid retaining wall of the system. In systems of the latter type, radiation is incident on the monitoring arrangement only after passing through the water to be purified.

Both of the above types of monitoring arrangements have deficiencies which limit the usefulness of the output information provided thereby. The problem with a monitoring arrangement which has an inlet that is close to the surface of a lamp is that the UV sensitive electronic device is unable to determine whether the UV radiation intensity at points more distant from the surface of the lamp is adequate to assure complete purification. The problem with a monitoring arrangement which has an inlet that is located at the fluid retaining wall of the system is that it allows a user to take measurements only through a fixed depth of liquid. As a result, such an arrangement prevents a user from measuring the UV radiation intensity at other distances from the surface of the UV lamp. A UV purification system which has UV monitoring arrangements of both types is shown in U.S. Pat. No. 4,336,223, which issued on June 22, 1982 in the name of L. Hillman.

SUMMARY OF THE INVENTION

In accordance with the present invention, there is provided an improved monitoring port which allows the intensity of UV radiation to be measured at any desired point between the outer surface of the UV lamp (or its protective envelope) and the fluid retaining wall of the purification system. Generally speaking, the monitoring port of the invention includes an elongated UV radiation transmitting member, which serves as a light pipe, and an improved sealing arrangement which allows the position of the transmitting member to be changed, while the purification system is operating, without allowing water to leak therefrom. The monitoring port of the invention also includes a locking arrangement which locks the transmitting member in place after it has been moved to the desired position. Together, these features allow a user to perform a series of measurements which give the UV radiation intensity in the system as a function of the distance from the UV lamp, the UV transparency of the water being purified and the quantity of UV blocking deposits which have accumulated on the internal surfaces of the system.

DESCRIPTION OF THE DRAWINGS

Other objects and advantages of the present invention will be apparent from the following description and drawings in which.

DESCRIPTION OF THE PREFERRED EMBODIMENTS

Figure 1:
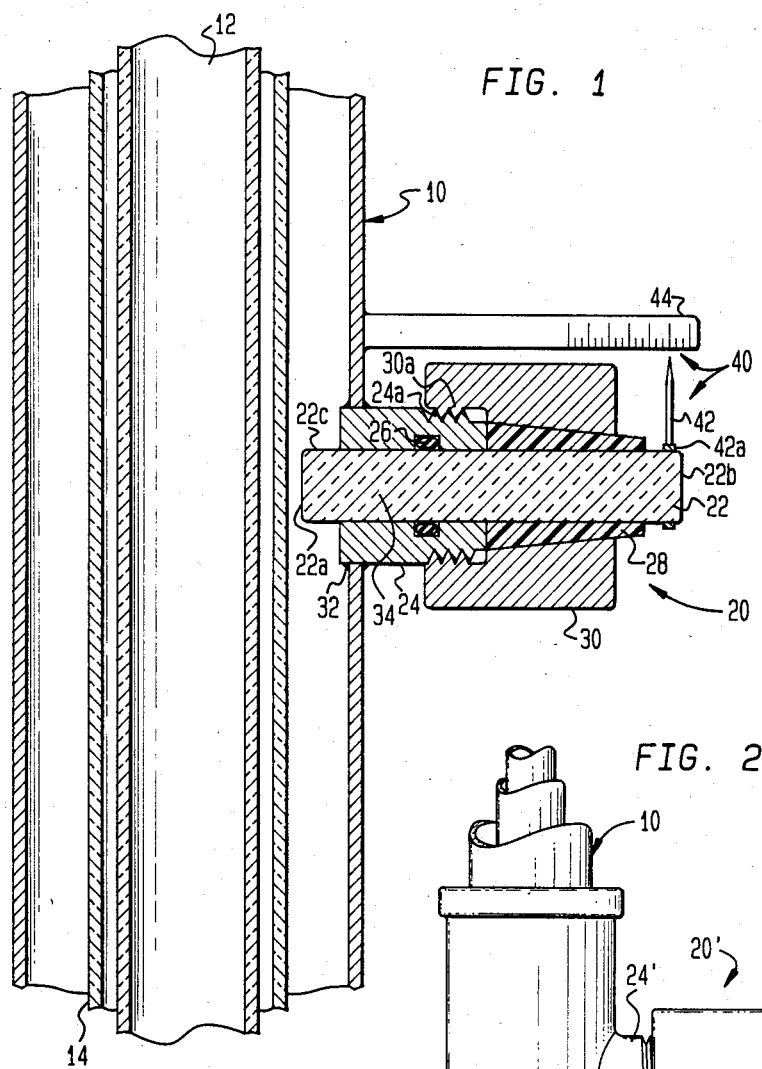
FIG. 1 is a partial cross-sectional view of a UV purification system which includes the preferred embodiment of the monitoring port of the invention.

Referring to FIG. 1, there is shown a partial cross-sectional view of one part of a flow-through UV purification system of a type that is suitable for use with the monitoring port of the present invention. This purification system includes a fluid-retaining vessel 10, which may comprise a tube or pipe composed of a corrosion-resistant material such as stainless steel or plastic. Centered within tube 10 are a UV lamp 12 and its tubular protective envelope or jacket 14 which is composed of a UV transparent material such as fused quartz. The ends of envelope 14 are sealed to tube 10 by sealing structures (not shown) in order to protect the fragile walls of UV lamp 12 from contact with the water within tube 10. Together, the outer surface of envelope 14 and the inner surface of tube 10 define a flow space within which the water that flows through the purification system is exposed to intense UV radiation from lamp 12.

In order to assure a continuous flow of water through the purification system, tube 10 is provided with an inlet and an outlet (not shown) which are preferably located in the sides thereof. The latter location allows the ends of tube 10 to be occupied by the above-mentioned sealing structures and by the electrical leads of lamp 12. Because sealing structures that are suitable for use in the purification system of FIG. 1 are well known to those skilled in the art, they will not be described in detail herein.

To the end that a user may measure the UV radiation intensity at any selected point between the outer surface of quartz envelope 14 and the inner surface of tube 10, there is provided the monitoring port 20 of the present invention. In the embodiment of FIG. 1, monitoring port 20 includes a UV transparent radiation transmitting member 22 which preferably comprises a rod of fused quartz. In operation, transmitting member 22 serves as a light pipe to receive UV radiation at inlet end 22a thereof and to output that radiation at outlet end 22b thereof. Because of the constancy and low magnitude of the losses that are associated with the absorption of UV radiation by the material of rod 22 and the internal reflection of UV radiation from the inner surface thereof, a fixed portion of the UV radiation that enters inlet end 22a of member 22 will emerge from outlet end 22b thereof. In other words, the UV radiation intensity at outlet 22b of member 22 will be a substantially constant fraction of the intensity of UV radiation at inlet 22a thereof. As a result, a UV sensitive measuring device, such as a photodiode or photocell, that is located at outlet 22b of member 22 will produce an output signal that is proportional to the output signal which would be produced if the device were located at inlet 22a of member 22.

To the end that inlet 22a of transmitting member 22 may be moved to any desired distance from the outer surface of envelope 12, monitoring port 20 includes a mounting member 24, a sealing member 26, and first and second locking members 28 and 30. In the embodiment of FIG. 1, mounting member 24 is permanently attached to tube 10 by a suitable water-tight weld 32. Passing through member 24 is a central hole 34 which is large enough to permit the free inward and outward movement of transmitting member 22. The leakage of the water through hole 34 is prevented by sealing member 26, which preferably comprises an O-ring that is positioned in a groove within mounting member 24. It will therefore be seen that inlet 22a of transmitting member 22 may be moved to any desired distance from the outer surface of envelope 14 without permitting fluid to leak from tube 10.

Once inlet end 22a of member 22 is located the desired distance from the envelope 14, it may be locked in that position by the locking assembly including locking members 28 and 30. To the end that this may be accomplished, first locking member 28 is preferably composed of an elastomeric material, such as rubber or soft plastic which, when compressed, will firmly grip and hold member 22. In addition, second locking member 30, which is preferably composed of metal, is provided with threads 30a which are adapted to engage the matching threads of mounting member 24. These threads assure that, as locking member 30 is tightened on mounting member 24, locking member 28 is compressed against member 22 and locks the same in place. This compressing action is made particularly effective by providing the outer surface of member 28 and the inner surface of member 30 with matching tapers.

When transmitting member 22 is to be moved to a new position, the user of the purification system need only loosen locking member 30, push or pull transmitting member 22 to the desired new position, and then retighten locking member 30. Significantly, this repositioning may be accomplished without draining the purification system, and without causing water to leak therefrom. This is because O-ring 26 seal maintains a liquid-tight seal between members 22 and 24 for all positions of member 22. Thus, monitoring port 20 makes it possible to measure the UV radiation intensity at any desired point in the layer of liquid between the outer surface of envelope 14 and the inner surface of the tube 12, while the purification system is in operation.

In order to make it easy to locate inlet 22a of member 22 at any desired distance from envelope 14, a positioning aid such as an indicator may be used. In the embodiment of FIG. 1 this positioning aid comprises a position indicator 40 including a pointer 42 that is attached to member 22 and a scale 44 that is attached to the wall of vessel 10. Alternatively, the positioning aid may include a stop and projection structure which define discrete predetermined positions for member 22. Such a structure might, for example, include a stop member which is attached to vessel 10 and which includes a series of steps that correspond to desired stop positions, and a projection which is attached to member 22 and which is adapted to engage the steps of the stop member. When being used with the latter type of positioning aid, member 22 may be rotated out of contact with the stop member to facilitate changes in its position. Other types of position indicating or measuring arrangements will be apparent to those skilled in the art.

If the outer wall of transmitting member 22 is not provided with a coating of a material which is opaque to UV radiation, some UV radiation may be able to enter member 22 through side surface 22c thereof. Since the UV rays that enter member 22 through side surface 22c originate at points that are more distant from envelope 12 than those that enter through end surface 22a, such rays tend to complicate the interpretation of the UV radiation intensity readings that are taken at output 22b of member 22. Accordingly, in those purification systems in which the UV rays that enter member 22 through side surface 22c produce objectionable errors, the side surface 22c of member 22 should be provided with a coating which is opaque to UV radiation. The effect of such a coating may also be produced by replacing quartz rod 22 with a length of property terminated stiff fiber optic cable which is provided with a UV opaque insulating sheath.

Figure 2:
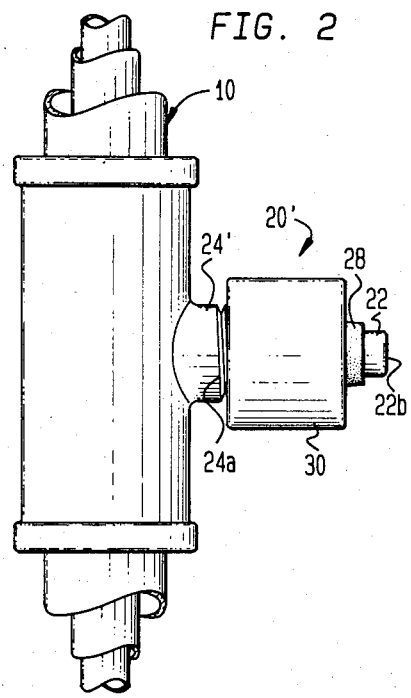
FIG. 2 is an external view of an alternative embodiment of the monitoring port of the invention.

Referring to FIG. 2, there is shown an external view of an alternative embodiment of the monitoring port of the invention. Monitoring port 20' of FIG. 2 is generally similar to monitoring port 20 of FIG. 1, like functioning parts being similarly numbered. Monitoring port 20' of FIG. 2 differs from port 20 of FIG. 1, however, in that its mounting member comprises a T-shaped pipe fitting 24' which is located in fluidic series with tube 10 of the purification system. Because of the functional similarity between the embodiment of FIGS. 1 and 2, the embodiment of FIG. 2 will not be described in detail herein.

In view of the foregoing, it will be seen that a monitoring port constructed in accordance with the present invention provides a number of advantages over previously used UV monitoring ports. Firstly, the monitoring port of the invention makes it possible to measure the effective UV radiation intensity at any desired distance from the UV lamp with which it is used. Secondly, the monitoring port of the invention makes it possible to determine the intensity profile of the UV radiation within the purification system and allows calculation of the absorption coefficient of the water being purified.. Finally, the monitoring port of the invention provides these results while the system is operating, without allowing water to leak out of the purification system.

What is claimed is:

1. An apparatus for use in measuring the intensity of UV radiation at any selected one of a plurality of distances from an elongated UV lamp, which is mounted adjacent to an exterior fluid retaining wall of a UV liquid purification system, at least two of said distances being greater than zero, as measured from said lamp or any wall protecting said lamp from the liquid in the system, in order to determine UV radiation intensity in the system as a function of distance from said lamp, comprising:

(a) a UV transparent radiation transmitting member having a light receiving end, (b) mounting means secured within a bore in said fluid retaining wall for slidably holding the transmitting member for movement in a direction generally transverse to said elongated UV lamp with said light receiving end facing said UV lamp, (c) sealing means for maintaining a liquid-tight seal between the transmitting member and the mounting means, and (d) locking means, separate from said sealing means, secured to said mounting means and contacting said transmitting member for locking the transmitting member with respect to said mounting means at a selected one of said distances from the UV lamp and for unlocking the transmitting member with respect to said mounting means to permit sliding movement of said transmitting member with respect to said mounting means in said generally transverse direction to another selected one of said distances.

2. The apparatus of claim 1 in which the locking means includes:

(a) a first, elastomeric locking member having a hole through which the transmitting member may be passed, and (b) a second locking member, connected to the mounting means, for compressing the first locking member around the transmitting member to lock the transmitting member with respect to said mounting means at a selected one of said distances from the UV lamp.

3. The apparatus of claim 1 in which the radiation transmitting member has an elongated rod-like shape.

4. The apparatus of claim 2 in which the second locking member and the mounting means are connected to one another by threads.

5. The apparatus of claim 2 in which the outer surface of the first locking member and the inner surface of the second locking member are tapered.

6. The apparatus of claim 1 in which the sealing means comprises an O-ring mounted within the mounting means in surrounding relation to said radiation transmitting member.

7. The apparatus of claim 3 in which all but the ends of the transmitting member are coated with a material that is opaque to UV radiation.

8. The apparatus of claim 1 including positioning means for facilitating the establishment of at least one of said selected distances.

9. The apparatus of claim 8 in which the positioning means includes a first positioning member attached to the transmitting member and a second positioning member attached to the fluid retaining wall of the purification system.

10. The apparatus of claim 9 in which the first positioning member is a pointer and in which the second positioning member is a distance indicating scale.

11. The apparatus of claim 9 in which the second positioning member is a stop member which defines a plurality of stop positions for the transmitting member, and in which the first positioning member includes a projection which is adapted to engage the stop member and thereby hold the transmitting member in one of said stop positions.

12. An apparatus for use in measuring the intensity of UV radiation at any selected one of a plurality of distances from a UV lamp which is mounted adjacent to an exterior fluid retaining wall of a UV liquid purification system, at least two of said distances being greater than zero, as measured from said lamp or any wall protecting said lamp from the liquid in the system, in order to determine UV radiation intensity in the system as a function of distance from said lamp, comprising:

(a) a mounting member secured with a bore in said fluid retaining wall and having an axial opening therethrough, (b) a UV transparent transmitting member having a light receiving end and slidably positioned within said opening for movement in a direction generally transverse to said elongated UV lamp with said light receiving end facing said UV lamp, (c) a sealing member for establishing a liquid,tight seal between the mounting member and the transmitting member, and (d) a locking assembly, separate from said sealing member, secured to said mounting member and contacting said transmitting member for locking the transmitting member with respect to said mounting member at a selected one of said distances from the UV lamp and for unlocking the transmitting member with respect to said mounting member to permit sliding movement of said transmitting member with respect to said mounting member in said generally transverse direction to another selected one of said distances.

13. The apparatus of claim 12 in which the locking assembly includes:

(a) a tightening member having threads adapted to engage mating threads on the mounting member, (b) a gripping member, positioned between the transmitting and tightening members, for gripping the transmitting member as the tightening member is tightened around the mounting member to lock the transmitting member with respect to said mounting member at a selected one of said distances from the UV lamp.

14. The apparatus of claim 13 in which the outer surface of the gripping member and the inner surface of the tightening member are similarly tapered.

15. The apparatus of claim 12 in which the transmitting member has an elongated rod-like shape.

16. The apparatus of claim 12 in which the sealing member comprises an O-ring mounted within the mounting member in surrounding relation to said transmitting member.

17. The apparatus of claim 12 in which all but the ends of the transmitting member are coated with a material that is opaque to UV radiation.

18. The apparatus of claim 12 including a positioning aid for facilitating the positioning of the transmitting member at one of said selected distances.

19. The apparatus of claim 18 in which the positioning aid includes a first positioning member attached to the transmitting member and a second positioning member attached to the fluid retaining wall of the system.

20. The apparatus of claim 19 in which the first positioning member is a pointer and in which the second positioning member is a distance indicating scale.

21. The apparatus of claim 19 in which the second positioning member is a stop member which defines a plurality of stop positions for the transmitting member, and in which the first positioning member includes a projection which is adapted to engage the stop member and thereby hold the transmitting member in one of said stop positions.

* * * * *